(12) United States Patent
Houin (10) Patent No.: US 10,596,929 B2
(45) Date of Patent: Mar. 24, 2020

(54) CHILD RESTRAINT SYSTEM INCLUDING HARNESS AND ADJUSTMENT MECHANISM

(71) Applicant: Jodi L. Houin, Columbia, MO (US)

(72) Inventor: Jodi L. Houin, Columbia, MO (US)

( * ) Notice: Subject to any disclaimer, the term of this patent is extended or adjusted under 35 U.S.C. 154(b) by 167 days.

(21) Appl. No.: 15/712,537

(22) Filed: Sep. 22, 2017

(65) Prior Publication Data

US 2019/0092193 A1    Mar. 28, 2019

(51) Int. Cl.
  *B60N 2/28* (2006.01)
(52) U.S. Cl.
  CPC ........... *B60N 2/2812* (2013.01); *B60N 2/286* (2013.01); *B60N 2/2863* (2013.01); *B60N 2002/2818* (2013.01)
(58) Field of Classification Search
  CPC .. B60N 2/2803; B60N 2/2812; B60N 2/2821; B60N 2/265; B60N 2002/2818; B60N 2002/2815; B60R 22/024; B60R 22/10; B60R 22/105; B60R 22/20; B60R 22/201; B60R 22/202; B60R 22/203; B60R 2022/025; B60R 2022/1831; B60R 2022/1843; B64D 11/0612
  See application file for complete search history.

(56) References Cited

U.S. PATENT DOCUMENTS

| | | | | |
|---|---|---|---|---|
| 1,376,625 A * | 5/1921 | Johnston | ................ | A47D 1/008 297/467 |
| 2,979,028 A * | 4/1961 | Zakely | ............... | A62B 35/0018 182/3 |
| 3,052,432 A * | 9/1962 | Martin | ................... | B64D 25/06 297/467 |
| 3,099,486 A * | 7/1963 | Scott | .................... | A47D 15/006 297/465 |
| 3,178,223 A * | 4/1965 | Martin | ................... | B64D 25/06 297/467 |
| 3,905,615 A * | 9/1975 | Schulman | ............... | B60R 21/18 280/730.1 |
| 4,302,049 A * | 11/1981 | Simpson | ............ | A44B 11/2526 24/632 |
| 4,487,383 A * | 12/1984 | Mazelsky | .............. | B64D 11/06 244/122 R |
| 4,640,550 A * | 2/1987 | Håkansson | ........... | B60R 22/203 280/801.2 |
| 4,685,741 A * | 8/1987 | Tsuge | ..................... | A44B 11/06 297/250.1 |
| 4,738,413 A * | 4/1988 | Spinosa | ................. | B64D 25/06 244/151 R |

(Continued)

*Primary Examiner* — Kyle J. Walraed-Sullivan
(74) *Attorney, Agent, or Firm* — Armstrong Teasdale LLP (57) ABSTRACT

A child restraint system is configured to secure a child in a seat. The child restraint system includes a harness configured to extend across the child. The harness includes at least one connector. The child restraint system includes at least one anchorage configured to releasably connect to the connectors. The at least one anchorage extends through at least one slot in the seat. In some embodiments, the child restraint system includes an adjustment mechanism coupled to the at least one anchorage and configured to adjust a position of the at least one anchorage relative to the seat. The adjustment mechanism has a locked configuration in which the adjustment mechanism is prevented from moving along the at least one slot and an unlocked configuration in which the adjustment mechanism is movable along the at least one slot.

14 Claims, 12 Drawing Sheets

(56) References Cited

U.S. PATENT DOCUMENTS

| | | | | |
|---|---|---|---|---|
| 5,149,136 | A * | 9/1992 | Maekawa | B60R 22/202 280/801.2 |
| 5,306,044 | A * | 4/1994 | Tucker | B60R 22/14 280/801.1 |
| 5,449,223 | A * | 9/1995 | Miculici | B60R 22/105 280/801.2 |
| 5,503,461 | A * | 4/1996 | Schreier | B60N 2/3084 297/467 |
| 5,562,326 | A * | 10/1996 | Stroud | B60R 22/14 297/465 |
| 5,641,200 | A * | 6/1997 | Howell | B62B 3/144 280/33.993 |
| 5,730,498 | A * | 3/1998 | Hanson | B60R 22/14 2/2.17 |
| 5,899,534 | A * | 5/1999 | Gray | B60N 2/3084 297/238 |
| 6,030,047 | A * | 2/2000 | Kain | B60N 2/2812 297/250.1 |
| 6,109,698 | A * | 8/2000 | Perez | B60N 2/265 297/467 |
| 6,254,184 | B1 * | 7/2001 | Kontos | B60N 2/2812 297/256.15 |
| 6,367,882 | B1 * | 4/2002 | Van Druff | B60R 22/12 297/467 |
| 6,398,302 | B1 * | 6/2002 | Freedman | B60N 2/2812 297/216.11 |
| 6,481,794 | B1 * | 11/2002 | Kassai | B60N 2/146 297/219.12 |
| 6,491,348 | B1 * | 12/2002 | Kain | B60N 2/2812 297/250.1 |
| 6,499,149 | B2 * | 12/2002 | Ashline | A42B 3/0473 2/411 |
| 6,547,334 | B1 * | 4/2003 | Girardin | B60R 22/105 297/467 |
| 6,695,412 | B2 | 2/2004 | Barger et al. | |
| 6,779,842 | B2 * | 8/2004 | McNeff | B60N 2/2806 297/250.1 |
| 6,857,430 | B2 * | 2/2005 | Morris | A61F 5/3776 128/869 |
| 7,347,494 | B2 * | 3/2008 | Boyle | B60N 2/2806 297/253 |
| 7,699,402 | B2 * | 4/2010 | DeLellis | B60R 22/02 297/467 |
| 8,123,294 | B2 * | 2/2012 | Hutchinson | B60N 2/2812 297/250.1 |
| 8,317,271 | B1 * | 11/2012 | Kopca | A61F 5/3784 297/465 |
| 8,678,512 | B2 * | 3/2014 | Wang | A44B 11/2511 297/483 |
| 8,720,846 | B2 * | 5/2014 | Wohlford | H04N 5/64 248/499 |
| 8,919,889 | B2 * | 12/2014 | Kane | A47D 15/006 297/484 |
| 8,960,804 | B2 * | 2/2015 | Knight | B60N 2/2803 297/466 |
| 9,067,561 | B2 * | 6/2015 | Crews | B60R 22/105 |
| 9,192,242 | B1 * | 11/2015 | Anderson | A47D 13/04 |
| 9,573,496 | B2 * | 2/2017 | Spence | B60N 2/265 |
| 9,776,534 | B2 * | 10/2017 | Yang | B60N 2/2812 |
| 9,981,629 | B2 * | 5/2018 | Farrugia | B60R 22/105 |
| 2002/0070593 | A1 * | 6/2002 | Takayama | B60N 2/2812 297/250.1 |
| 2002/0195867 | A1 * | 12/2002 | Barger | B60N 2/2812 297/484 |
| 2004/0207191 | A1 * | 10/2004 | Arnold | B60R 22/203 280/801.2 |
| 2005/0035635 | A1 * | 2/2005 | Hendrikus | B60N 2/2812 297/250.1 |
| 2005/0110318 | A1 * | 5/2005 | Meeker | B60N 2/2812 297/256.16 |
| 2006/0103229 | A1 * | 5/2006 | Fransen | B60N 2/2812 297/484 |
| 2006/0108845 | A1 * | 5/2006 | Balensiefer | B60N 2/2812 297/250.1 |
| 2007/0057544 | A1 * | 3/2007 | Nakhla | B60N 2/2812 297/250.1 |
| 2007/0228788 | A1 * | 10/2007 | Meeker | B60N 2/2806 297/250.1 |
| 2008/0168603 | A1 * | 7/2008 | Ayette | A61G 1/044 5/628 |
| 2008/0201923 | A1 * | 8/2008 | Barger | B60N 2/2812 24/69 ST |
| 2008/0258527 | A1 * | 10/2008 | Gower | B60N 2/2812 297/256.15 |
| 2010/0038954 | A1 * | 2/2010 | Chen | B60N 2/2812 297/468 |
| 2010/0264705 | A1 * | 10/2010 | Karremans | B60N 2/2812 297/250.1 |
| 2011/0221258 | A1 * | 9/2011 | Chen | B60N 2/2812 297/484 |
| 2011/0309663 | A1 * | 12/2011 | Brunick | B60N 2/2812 297/250.1 |
| 2012/0007397 | A1 * | 1/2012 | Fritz | B60N 2/2806 297/250.1 |
| 2012/0098304 | A1 * | 4/2012 | Gaudreau, Jr. | B60N 2/2812 297/216.11 |
| 2012/0169098 | A1 * | 7/2012 | Spence | B60N 2/2812 297/256.15 |
| 2012/0242127 | A1 * | 9/2012 | Gaudreau, Jr. | B60N 2/2812 297/250.1 |
| 2012/0242129 | A1 * | 9/2012 | Gaudreau, Jr. | B60N 2/2812 297/256.16 |
| 2013/0015690 | A1 * | 1/2013 | Mendis | B60N 2/2806 297/250.1 |
| 2013/0187421 | A1 * | 7/2013 | Foye | B60R 22/024 297/232 |
| 2015/0145297 | A1 * | 5/2015 | Lee | B60N 2/60 297/219.1 |
| 2015/0182036 | A1 * | 7/2015 | Wigzell | B60N 2/2812 297/256.15 |
| 2017/0043683 | A1 * | 2/2017 | Yang | B60N 2/2812 |
| 2017/0043684 | A1 * | 2/2017 | Yang | B60N 2/2812 |
| 2017/0043744 | A1 * | 2/2017 | Dingman | B60R 22/201 |
| 2019/0070984 | A1 * | 3/2019 | Schmitz | B60N 2/2851 |
| 2019/0077282 | A1 * | 3/2019 | Reaves | B60N 2/2869 |
| 2019/0092193 | A1 * | 3/2019 | Houin | B60N 2/2812 |

* cited by examiner

CHILD RESTRAINT SYSTEM INCLUDING HARNESS AND ADJUSTMENT MECHANISM

FIELD

The field of the disclosure relates generally to child restraint systems. More particularly, this disclosure relates to a child restraint system including a harness and adjustment mechanism.

BACKGROUND

Child restraint systems are used to safely secure children in car seats, high chairs, and other apparatus. Typically, child restraint systems include a number of straps and buckles. To secure a child in the apparatus, the child must be positioned in the apparatus, each strap must be positioned across the child, and each buckle must be engaged. To remove a child, the buckles must be disengaged and the straps removed from the child. Accordingly, securing and unsecuring the child requires moving the child and the straps into specific positions relative to each other, which can be difficult, especially with an uncooperative child.

In addition, as children grow, the child restraint systems need to be adjusted or replaced to accommodate the children. Known child restraint systems may be difficult to adjust. For example, some known systems include separate openings that receive the straps in different positions. To adjust such systems, the operator must remove each strap from a first opening and pass it through a second opening. In addition, some systems require parts to be removed and/or added to the safety restraint system for adjustment. As a result, such systems may not be properly installed and may not function properly because an operator may incorrectly adjust and/or install such child restraint systems.

Moreover, child restraint systems, especially those used in car seats, are subject to rigorous safety standards. Accordingly, it has been difficult to provide innovations in the field that simplify use and meet standards to provide the necessary protection for the child.

Accordingly, a need exists for a child restraint system that is simple to operate and to adjust and that properly protects the child.

BRIEF DESCRIPTION

In one aspect, a car seat includes a lower support configured to support a lower body of a child and an upper support connected to the lower support. The upper support is configured to support an upper body of the child. The upper support extends from the lower support at an angle relative to the lower support. At least one of the lower support and the upper support defines at least one slot extending along a longitudinal axis of the at least one of the lower support and the upper support. The car seat also includes a child restraint system configured to secure the child in the car seat. The child restraint system includes a harness configured to extend across the child. The harness includes at least one connector. The child restraint system includes at least one anchorage configured to releasably connect to the at least one connector. The at least one anchorage extends through the at least one slot. The child restraint system further includes an adjustment mechanism coupled to the at least one anchorage and configured to adjust a position of the at least one anchorage relative to the at least one of the upper support and the lower support. The adjustment mechanism has a locked configuration in which the adjustment mechanism is prevented from moving along the slot and an unlocked configuration in which the adjustment mechanism is movable along the at least one slot.

In another aspect, a child restraint system is configured to secure a child in a seat. The child restraint system includes a harness configured to extend across the child. The harness includes connectors. The child restraint system also includes anchorages configured to releasably connect to the connectors. Each anchorage is configured to extend through a slot in the seat. The child restraint system further includes an adjustment mechanism coupled to at least one of the anchorages and configured to adjust a position of the anchorage relative to the seat. The adjustment mechanism has a locked configuration in which the adjustment mechanism is prevented from moving along the slot and an unlocked configuration in which the adjustment mechanism is movable along the slot.

In another aspect, a child restraint system is configured to secure a child in a seat. The child restraint system includes a harness configured to extend across the child. The harness includes at least five connectors. The child restraint system also includes anchorages configured to releasably connect to the connectors. The anchorages include at least one shoulder anchorage configured to be positioned adjacent a shoulder of the child.

This summary is provided to introduce a selection of concepts in a simplified form that are further described below. This summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the several views of the drawings.

DETAILED DESCRIPTION

Figure 1:
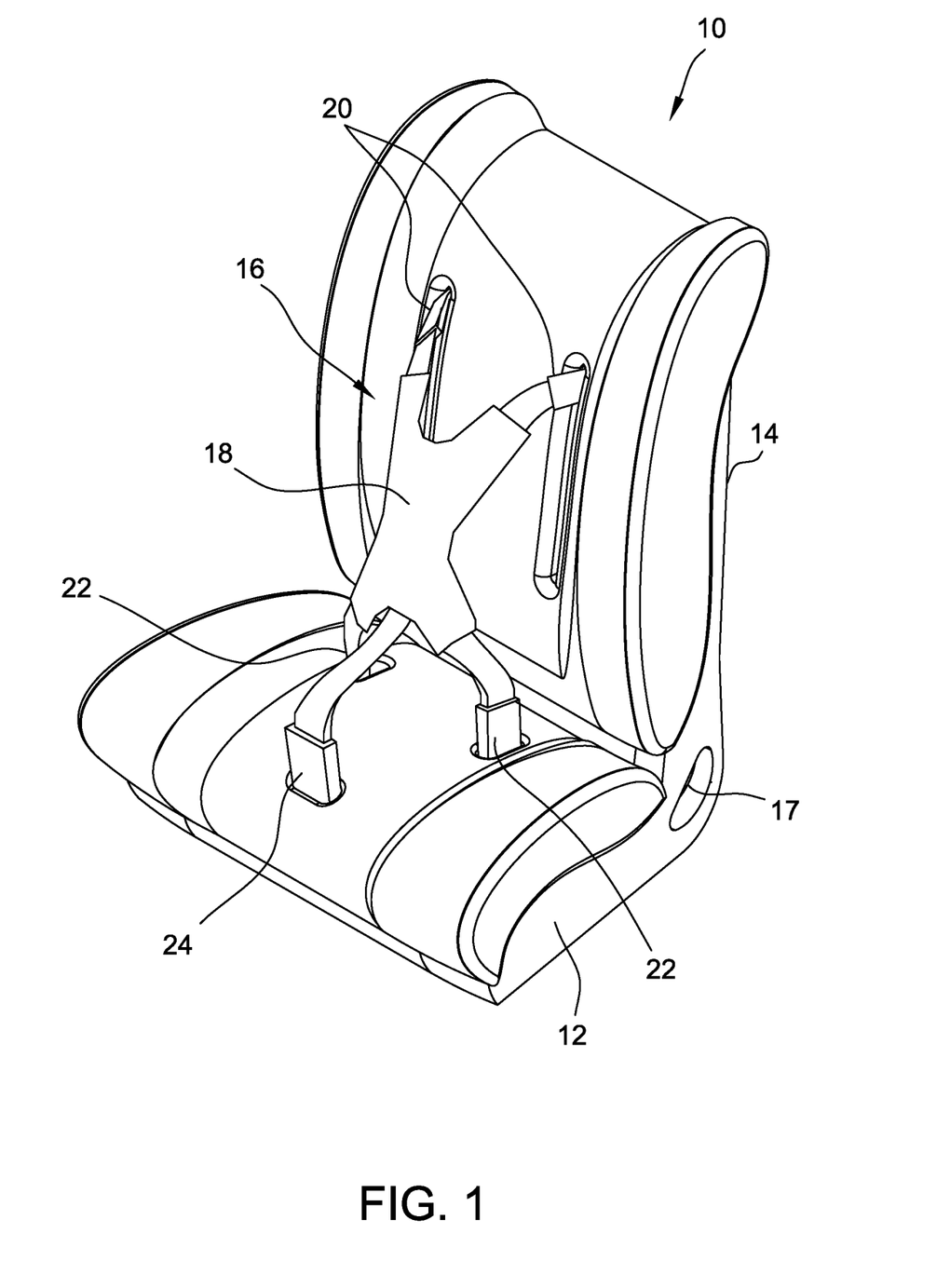
FIG. 1 is a perspective view of one embodiment of a car seat including a child restraint system.

Referring to FIG. 1, a car seat 10 includes a lower support 12, an upper support 14, and a child restraint system 16. The car seat 10 is configured to be secured to a seat of a vehicle and support a child. The child restraint system 16 is configured to retain the child in the car seat 10 and protect the child during movement of the vehicle. In the example embodiment, the car seat 10 includes openings 17 to receive a seat belt (not shown) and/or other anchoring mechanisms. In alternative embodiments, the car seat 10 may be positioned in a vehicle in any manner that enables the car seat 10 to function as described. For example, in some embodiments, the car seat 10 may be positioned in a base that is secured to the vehicle. In further embodiments, the car seat 10 may include and/or receive straps, hooks, and/or any other engagement components that facilitate securing the car seat 10 in position.

The lower support 12 is configured to rest on the seat of the vehicle and support a lower body of a child. The upper support 14 is connected to the lower support 12 and is configured to support an upper body of the child. The upper support 14 extends from the lower support 12 at an angle relative to the lower support. Specifically, in the illustrated embodiment, the upper support 14 and the lower support 12 form an approximately 90 degree angle. Accordingly, the upper support 14 and the lower support 12 form an L-shaped seat for the child. The upper support 14 may be adjustable relative to the lower support 12. For example, in some embodiments, the upper support 14 and the lower support 12 may be connected by a hinge. In further embodiments, the longitudinal position and/or length of the upper support 14 may be adjustable. Accordingly, the car seat 10 may be configured to accommodate children of different sizes.

In the illustrated embodiment, the car seat 10 is a forward-facing car seat in which the upper support 14 is configured be positioned against a back support of a seat of a vehicle. Accordingly, the child faces towards the front end of the vehicle when the child is secured in the car seat 10. In alternative embodiments, the car seat 10 may have any configuration that enables the car seat 10 to function as described. For example, in some embodiments, the car seat 10 may have a rear-facing configuration.

In some embodiments, the car seat 10 may include components such as covers, pads, liners, supports, and any other suitable components. For example, the car seat 10 may include head supports to allow the car seat to be used for smaller children such as newborns. Such accessories and components may be removable to facilitate the car seat 10 being adjustable and accommodating children. In the illustrated embodiment, the car seat 10 includes removable cushions or covers 19 (shown in FIG. 3) on the upper support 14 and/or the lower support 12. In alternative embodiments, the car seat 10 may include any components that enable the car seat to function as described.

In reference to FIGS. 1-5, the child restraint system 16 includes a harness 18, anchorages 20, 22, 24, first and second adjustment mechanisms 26, and a bracket 28. The child restraint system 16 may be used with other apparatus in addition to the car seat 10. For example, in some embodiments, the child restraint system 16 may be used with car seats, high chairs, swings, bouncers, walkers, strollers, and any other apparatus that requires a child to be secured in position.

Figure 2:
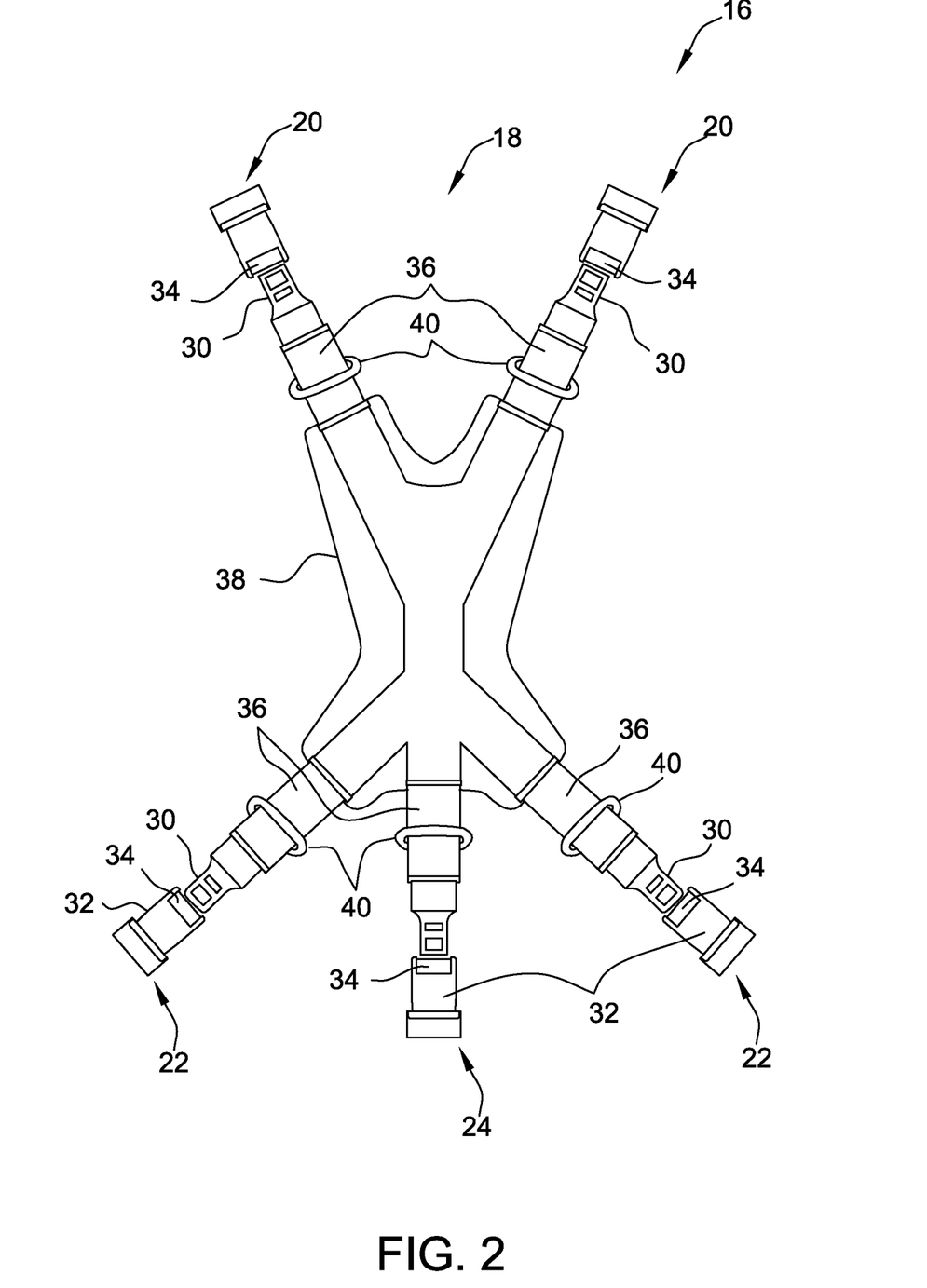
FIG. 2 is a plan view of a harness of the child restraint system shown in FIG. 1.

FIG. 2 is a plan view of a harness 18 of the child restraint system 16. The harness 18 is configured to extend across the child and retain the child in the car seat 10 (shown in FIG. 1). The harness 18 includes at least five points of connection. Specifically, in the illustrated embodiment, the harness 18 is connected to first and second shoulder anchorages 20, first and second hip anchorages 22, and a middle anchorage 24. When the child is properly positioned in the car seat 10 (shown in FIG. 1) the shoulder anchorages 20 are positioned adjacent the child's shoulders, the hip anchorages 22 are positioned adjacent the child's hips, and the middle anchorage 24 is positioned between the child's legs.

The harness 18 is releasably connected to each of the anchorages 20, 22, 24 by connectors 30. In the illustrated embodiment, the connectors 30 include tongues that are configured to extend into buckles 32 of the anchorages 20, 22, 24. The connectors 30 may be released by pressing actuators 34. In alternative embodiments, the harness 18 may be connected to the anchorages 20, 22, 24 in any manner that enables the child restraint system 16 to operate as described. For example, in some embodiments, the connectors 30 may include buckles 32 that receive tongues of the anchorages 20, 22, 24.

The child restraint system 16 allows a child to be quickly and simply secured in the car seat 10. For example, the connectors 30 are positioned on sides of the child adjacent the upper support 14 and the lower support 12 when the connectors are secured to the anchorages 20, 22, 24. In addition, the child restraint system 16 allows the child to be removed from the car seat without releasing all the connectors 30. For example, the operator may remove a child by releasing only the connectors 30 in the hip anchorages 22 and in the middle anchorage 24. Accordingly, the connectors 30 may remain connected in the shoulder anchorages 20. As a result, the risk of disturbing or injuring the child while securing and unsecuring the child using the child restraint system 16 is reduced in comparison to at least some known systems such as systems including full body straps and a central clip connecting the straps.

The harness 18 includes straps 36 extending between the connectors 30, and a cover 38 extending over and between the straps. Accordingly, the harness 18 provides the appearance of a vest on the child when the child is secured using the child restraint system 16. The straps 36 are permanently joined together, i.e., the straps may not be separated without damaging the straps. The straps 36 may be joined by welds, stitches, adhesive, and/or in any suitable manner. In some embodiments, the straps 36 may be formed as a single structure. In the illustrated embodiment, the length of the straps 36 may be adjusted. For example, the straps 36 include adjustors 40. In alternative embodiments, the harness 18 may include any straps 36 that enable the harness 18 to function as described. In some embodiments, the straps 36 may be omitted and the connectors 30 may be attached directly to the cover 38. In further embodiments, one or more of the straps 36 of the harness 18 may be attached directly to the respective anchorage 20, 22, 24 and the respective connector(s) 30 may be omitted. In some embodiments, at least one strap 36, such as the middle strap, has a different configuration than at least one other strap 36. For example, in some embodiments, the middle strap 36 is wider than at least one other strap.

The adjustors 40 may include clips that selectively retain the straps 36 at a desired length. For example, the straps 36 may extend through the adjustors 40 such that the adjustors form an overlap or loop in the strap. The adjustors 40 allow the length of the straps 36 to be adjusted by positioning the adjustors 40 along the straps and adjusting the overlap of the straps. In alternative embodiments, the harness 18 may include any adjustors 40 that enable the harness 18 to function as described.

In this embodiment, the cover 38 is pliable and is configured to conform to the body of the child. The cover 38 may be made of fabric, vinyl, rubber, and any other pliable material that enables the cover 38 to function as described. The cover 38 is attached to each strap 36 and enables the straps to be moved as a single structure. Moreover, the cover 38 maintains the straps 36 in desired positions and facilitates securing the harness to the anchorages 20, 22, 24. In alternative embodiments, the child restraint system 16 may include any cover 38 that enables the child restraint system 16 to function as described.

The straps 36 may include any materials that enable the straps to function as described. For example, in some embodiments, the straps 36 may include fabrics such as polyester and nylon.

Figure 3:
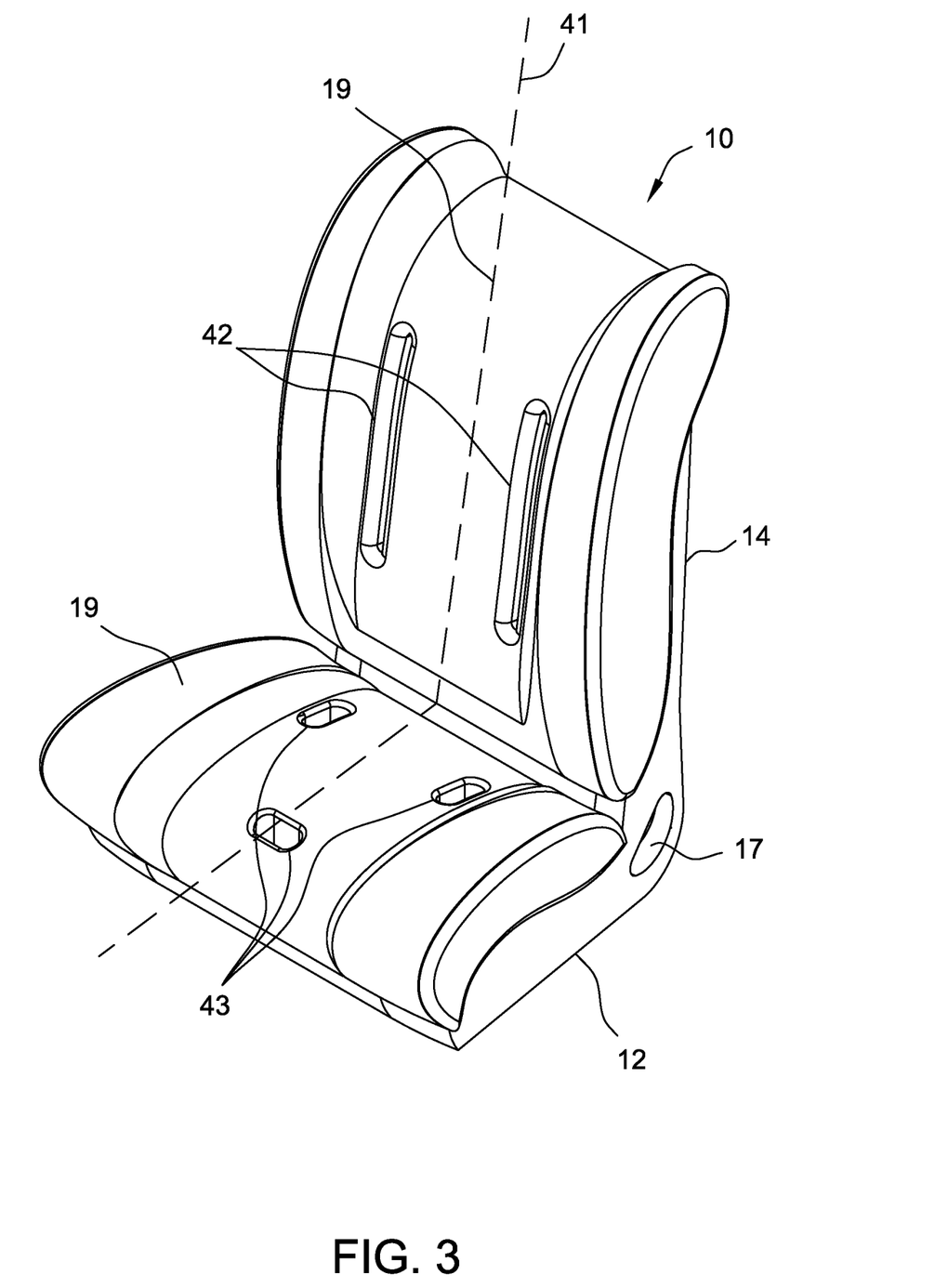
FIG. 3 is a perspective view of the car seat shown in FIG. 1 with the harness removed.
Figure 4:
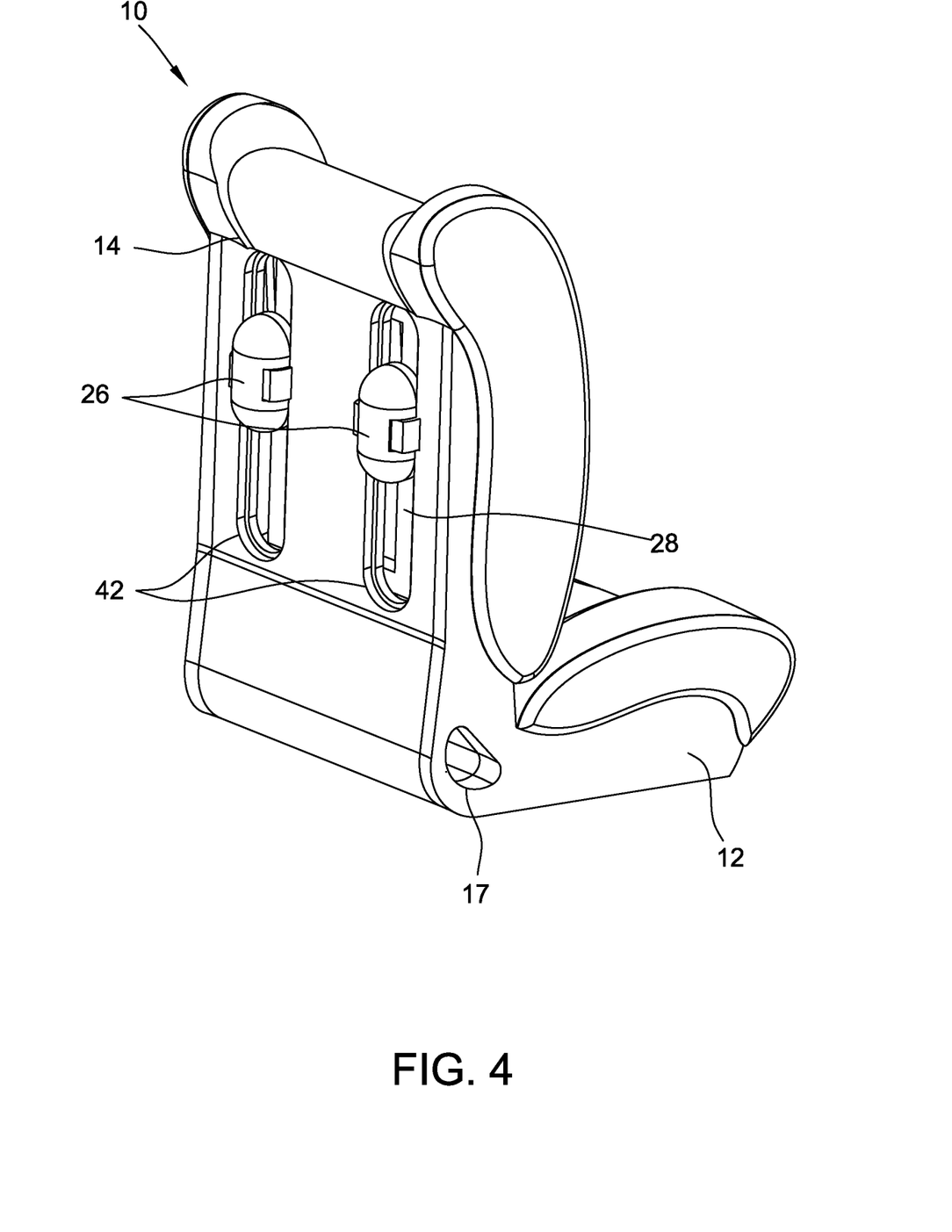
FIG. 4 is a rear perspective view of the car seat shown in FIG. 1.
Figure 5:
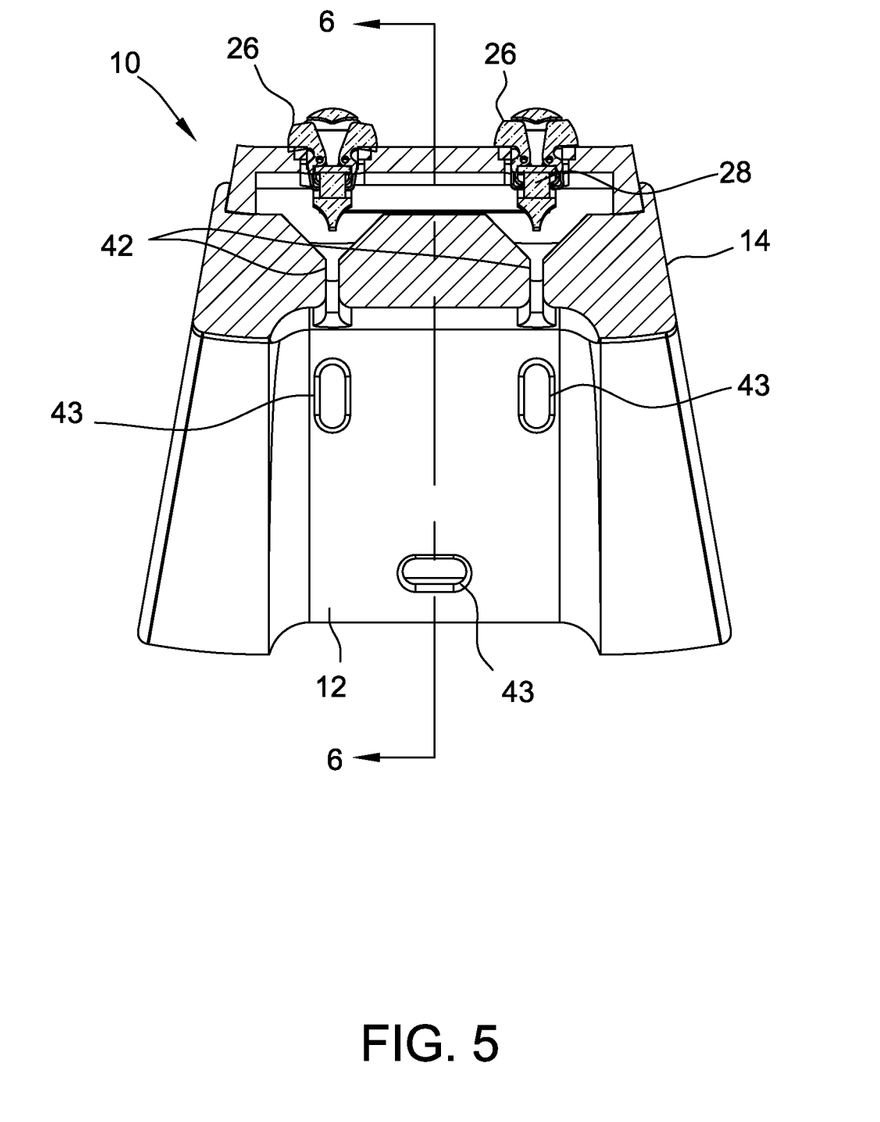
FIG. 5 is a top view of the car seat shown in FIG. 1.
Figure 6:
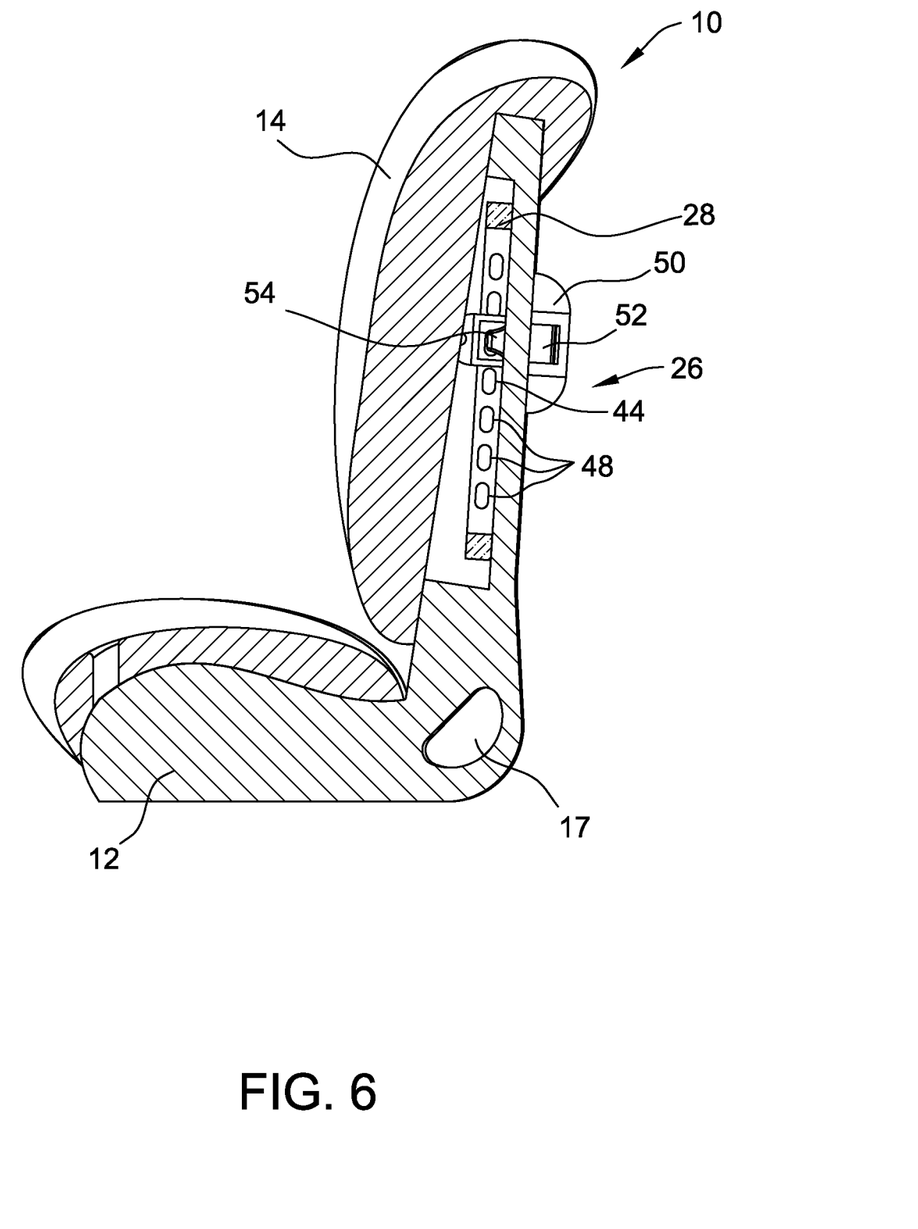
FIG. 6 is a sectional view of the car seat shown in FIG. 1, taken along line 6-6.

In reference to FIG. 3, the car seat 10 defines openings configured to receive the anchorages 20, 22, 24 (shown in FIG. 2). Specifically, the upper support 14 defines two slots 42 extending along a longitudinal axis 41 of the upper support. The slots 42 are configured to receive the shoulder anchorages 20 (shown in FIG. 2). The slots 42 are sized to allow the shoulder anchorages 20 to be moved within the slots and positioned approximately adjacent a child's shoulders. The lower support 12 defines openings 43 configured to receive the hip anchorages 22 and the middle anchorage 24. In some embodiments, the hip anchorages 22 and/or the middle anchorage 24 may be positionable in the openings 43. For example, in some embodiments, the openings 43 may be elongated slots that extend along a longitudinal axis of the lower support 12. In alternative embodiments, the car seat 10 may include any openings that enable the car seat 10 to function as described. For example, in some embodiments, the upper support 14 may include openings configured to receive the hip anchorages 22.

In reference to FIGS. 1 and 4-8, the adjustment mechanisms 26 are coupled to the shoulder anchorages 22 and are configured to adjust the position of the anchorages relative to the upper support 14. The first and second adjustment mechanisms 26 are positioned on the back side of the upper support 14 opposite from the harness 18. Each adjustment mechanism 26 has a locked configuration in which the adjustment mechanism is prevented from moving along the slot 42 and an unlocked configuration in which the adjustment mechanism is movable along slot. In alternative embodiments, the car seat 10 may include any adjustment mechanisms 26 that enable the car seat 10 to function as described. For example, in some embodiments, at least one adjustment mechanism 26 may be positioned adjacent the lower support 12 to enable adjustment of at least one of the anchorages 22, 24.

The adjustment mechanisms 26 may include any materials that enable the adjustment mechanism to function as described herein. For example, in some embodiments, the adjustment mechanisms 26 may include plastic, metal, and/or any other suitable material.

Figure 7:
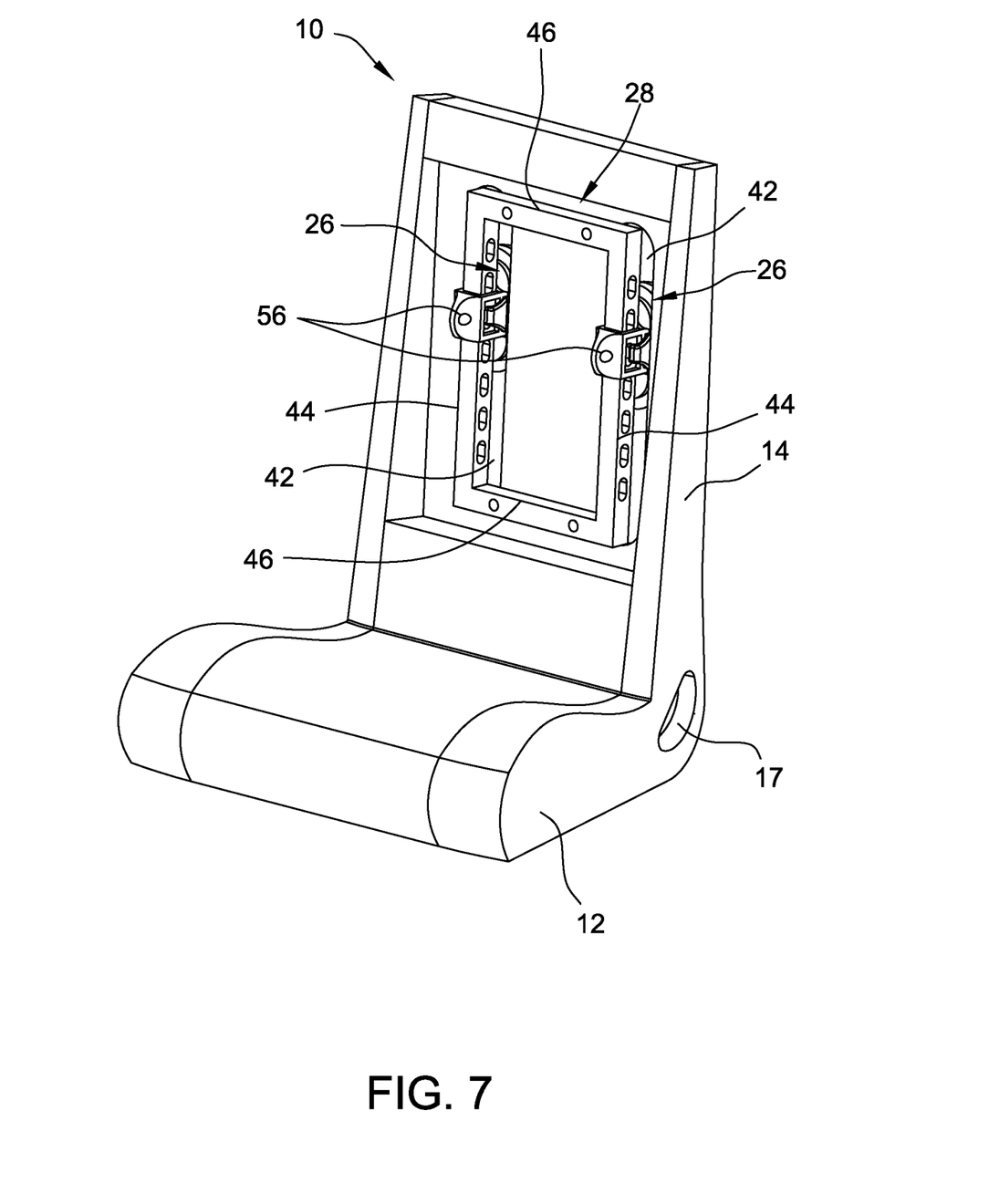
FIG. 7 is a perspective view of the car seat shown in FIG. 1 with a portion removed to show a bracket of the child restraint system.
Figure 8:
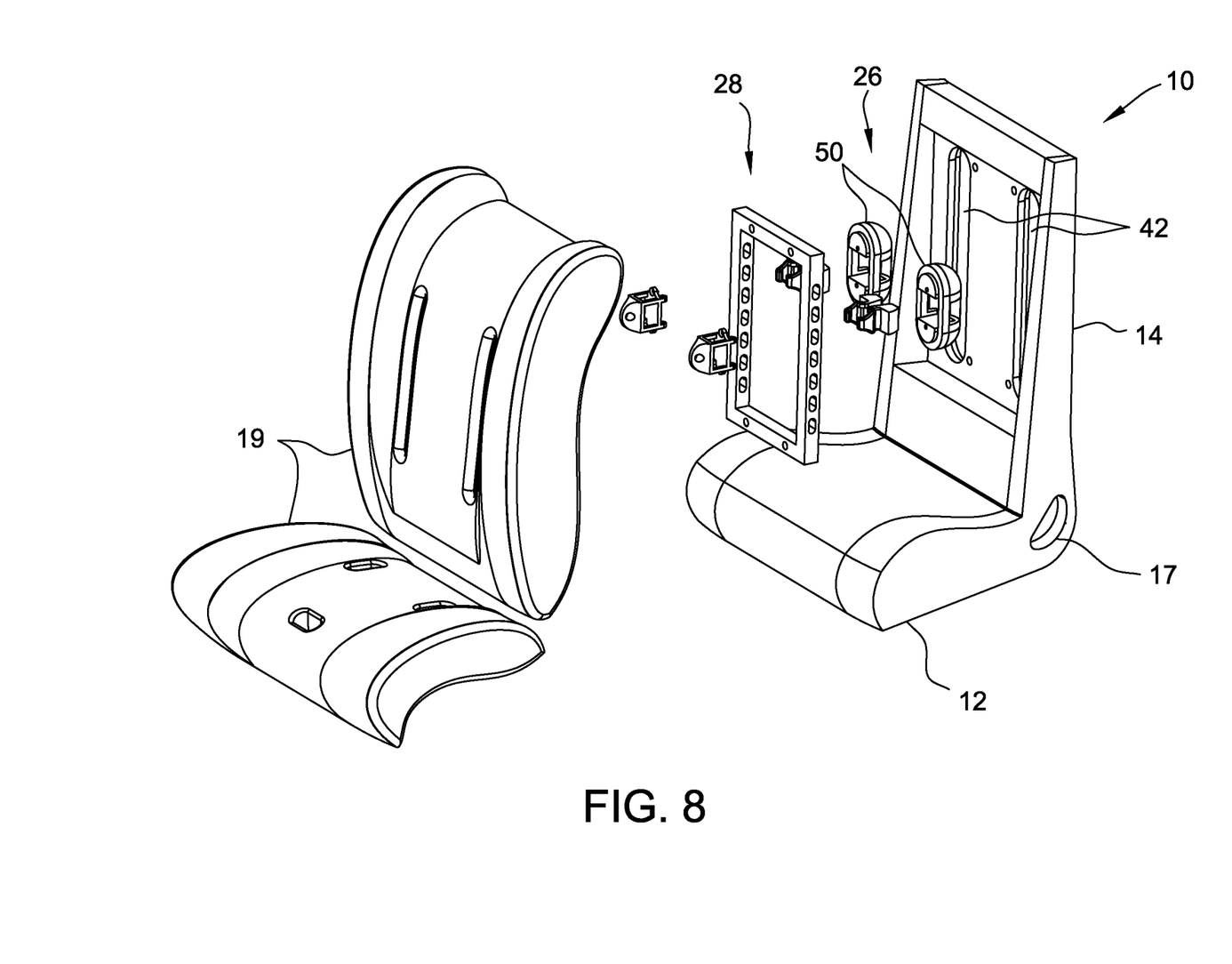
FIG. 8 is an exploded perspective view of the car seat shown in FIG. 1.

The bracket 28 is coupled to the upper support 14. The bracket 28 is rectangular and includes two vertical rails 44 and two horizontal rails 46. The horizontal rails 46 are attached to the upper support 14. The verticals rails 44 extend along the slots 42. The vertical rails 44 are configured to support the adjustment mechanisms 26 such that the adjustment mechanisms are movable along the slots 42. The vertical rails 44 may include a plurality of notches or openings 48 that define a plurality of positions for each adjustment mechanism 26. In alternative embodiments, the car seat 10 may include any bracket 28 that enables the car seat 10 to function as described.

Figure 9:
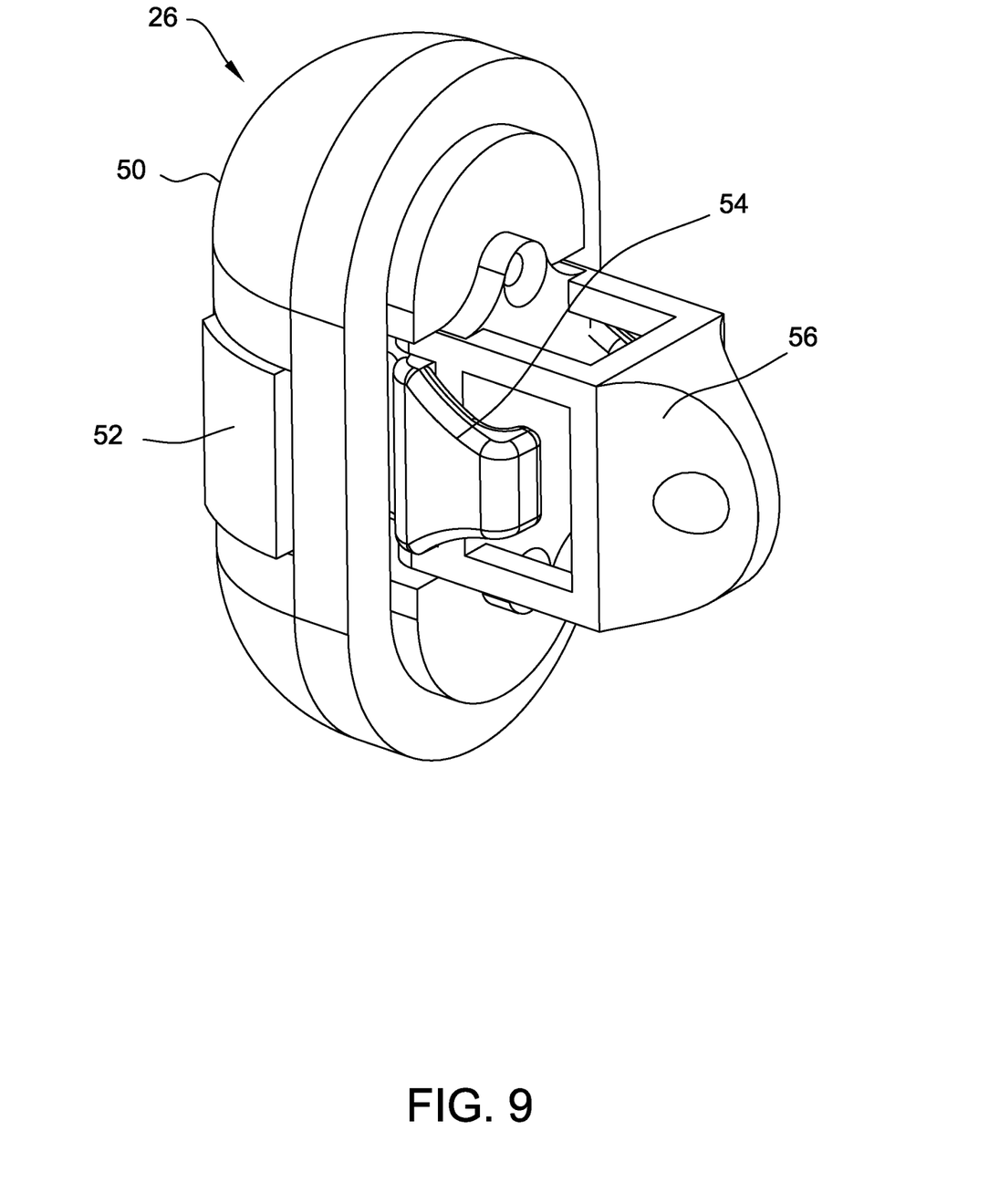
FIG. 9 is a perspective view of an adjustment mechanism of the child restraint system shown in FIG. 1.
Figure 10:
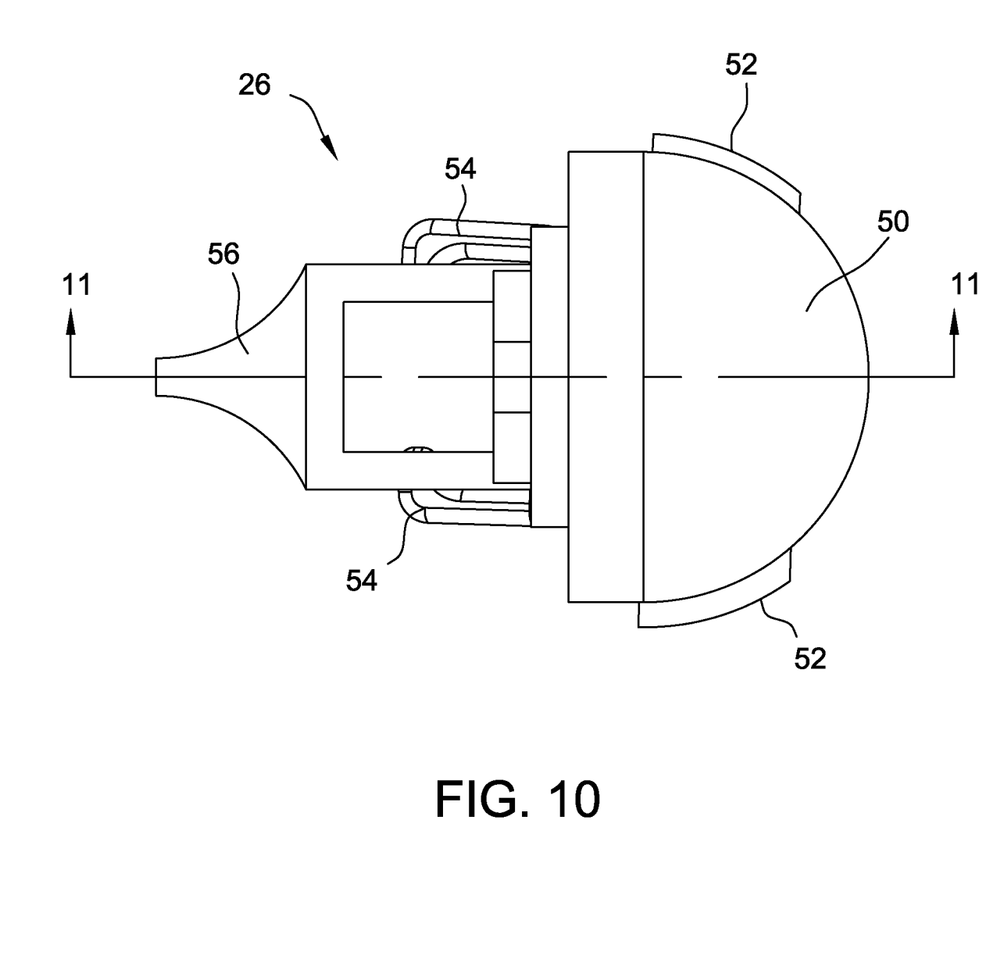
FIG. 10 is a top view of the adjustment mechanism shown in FIG. 9.
Figure 11:
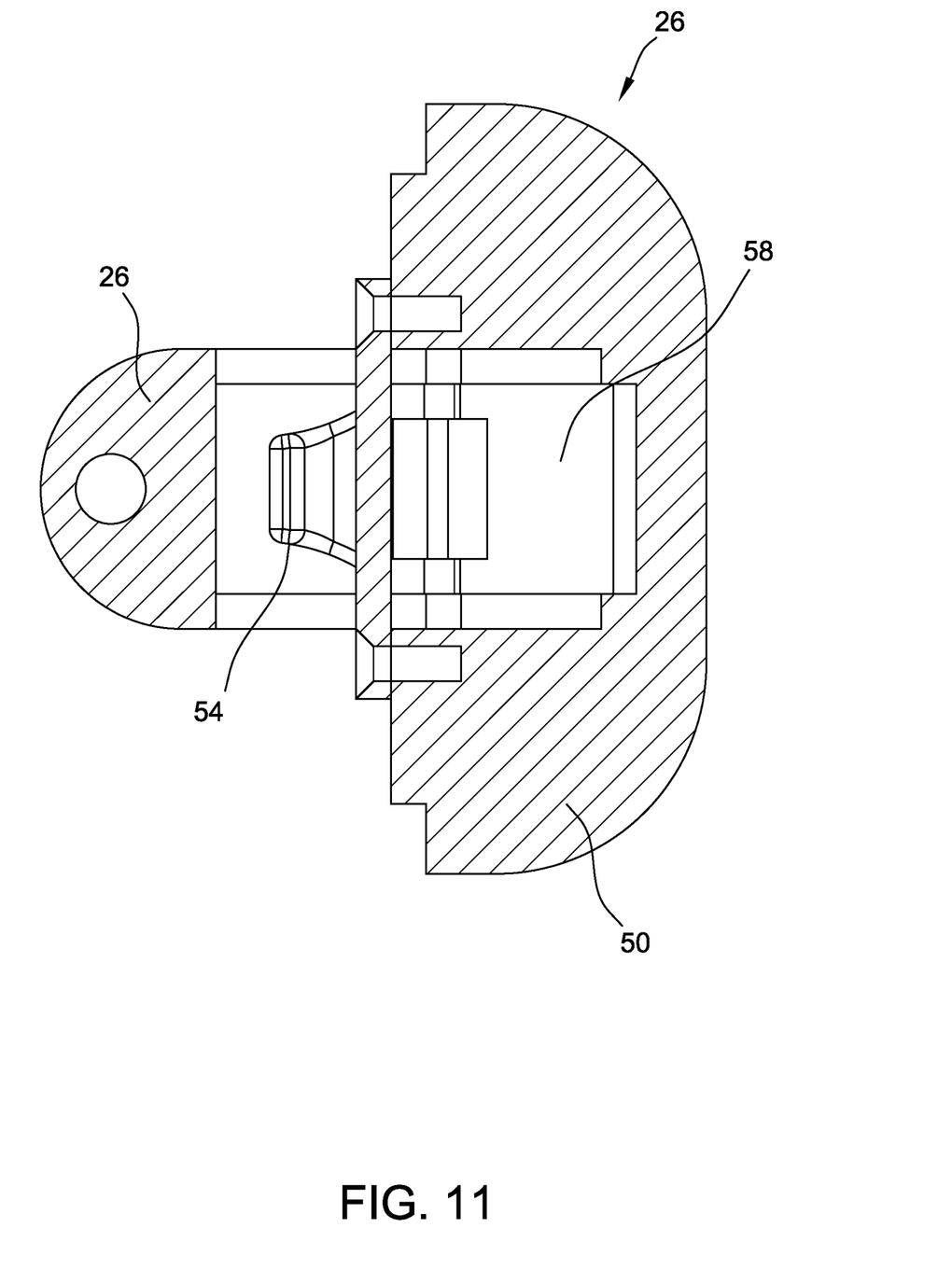
FIG. 11 is a sectional view of the adjustment mechanism shown in FIGS. 9 and 10, taken along line 11-11.

In reference to FIGS. 9-11, each adjustment mechanism 26 includes a body 50, actuators 52, engagement features 54, and a guide 56. The guides 56 extend about the rails 44 and allow the adjustment mechanisms 26 to move along the rails 44. In addition, the guides 56 are configured to couple to the anchorages 20, 22, 24 (shown in FIG. 1). The engagement features 54 are positionable between a first position in which the engagement features engage the bracket 28 (shown in FIG. 7) and a second position in which the engagement features are spaced from the bracket. The actuators 52 are configured to move the engagement features 54 between the first position and the second position. For example, the engagement features 54 may be connected to the body 50 by hinges. The actuators 52 may be pressed to cause the engagement features 54 to pivot about the hinges. In addition, each adjustment mechanism 26 includes a bias mechanism 58 configured to bias the engagement features 54 towards the first position to ensure that the adjustment mechanisms 26 maintain a desired position along the rails 44. For example, in the illustrated embodiment, each actuator 52 is at least partially formed by a leaf spring, broadly a bias mechanism, 58 connected to the body 50 and the engagement feature 54. In a neutral position, the bias mechanism 58 biases the engagement feature 54 towards the first position. The actuator 52 may be pressed to overcome the bias force and move the engagement feature 54 to the second position. In alternative embodiments, the adjustment mechanisms 26 may be positionable in any manner that enables the adjustment mechanisms to function as described herein.

In the first position, the engagement features 54 are configured to extend into the openings 48 of the vertical rail 44 and maintain the adjustment mechanism 26 in a desired position relative to the bracket 28. Accordingly, the adjustment mechanism 26 is in the locked configuration when the engagement features 54 are in the first position. The adjustment mechanism 26 is in the unlocked configuration when the engagement features 54 are in the second position. In alternative embodiments, the adjustment mechanisms 26 may be secured to the bracket 28 in any manner that enables the car seat 10 to function as described.

During operation, a child may be positioned within the car seat 10 and secured using the child restraint system 16. The harness 18 may be positioned across the child and each of the connectors 30 secured to the respective anchorage 20, 22, 24 to retain the child within the car seat 10. Some of the connectors 30 may be secured to the anchorages 20, 22, 24 prior to the child being positioned within the seat. For example, the connectors 30 may be secured to the shoulder anchorages 20 prior to positioning the child in the car seat 10 and the harness 18 may be positioned over the child's head. Alternatively, the connectors 30 may be secured to one shoulder anchorage 20 and one hip anchorage 22 and the harness 18 may be positioned on a child's side. In addition, sometimes, a connector 30 may be secured to the middle anchorage 24 and the harness 18 may be positioned below the child. In alternative embodiments, the harness 18 may be positioned and secured in any manner that enables the child restraint system 16 to function as described herein.

To release the child from the car seat 10, one or more of the connectors 30 may be released from the respective anchorages 20, 22, 24 by pressing the respective actuator 34. The operator may selectively release some of the connectors 30 and may leave some connectors secured in the anchorages 20, 22, 24. For example, the connectors 30 may be released from the shoulder anchorages 20 to allow the child to be lifted from the car seat 10. Alternatively, the connectors 30 may be released from the hip anchorages 22 and the middle anchorage 24. Sometimes, the connectors 30 may be released from one hip anchorage 22 and one shoulder anchorage 20. Further, each connector 30 may be released except the connector 30 in the middle anchorage 24. As a result, the harness 18 allows the operator to select which connectors 30 are convenient to connect/reconnect and simplifies use of the car seat 10. In addition, the harness 18 may be easily and quickly removed from the car seat 10 by releasing all the connectors. Accordingly, the harness 18 may be removed without having to remove and insert straps or having to access underneath or behind the car seat 10.

To adjust the child restraint system 16 and accommodate a child of a different size, the operator uses the adjustment mechanisms 26 to adjust the positions of the shoulder anchorages 20. The operator presses the actuator 52 to disengage the engagement features 54 from the bracket 28 and move the adjustment mechanism 26 into the unlocked position. In the unlocked position, the operator may move the adjustment mechanism 26 and, thereby, the respective anchorage 20 along the slot 42 and into a desired position. The operator then releases the actuator 52 and allows the engagement features 54 to move into the respective openings in the bracket 28. Accordingly, the adjustment mechanism 26 moves into the locked configuration at the desired position and is prevented from moving relative to the bracket 28. The operator repeats the process for each adjustment mechanism 26. In some embodiments, the adjustment mechanisms 26 may be coupled to the hip anchorages 22 and/or the middle anchorage 24. Accordingly, the adjustment mechanisms 26 allow adjustment of the child restraint system 16 without having to remove or insert straps. As a result, the child restraint system 16 is simpler to operate than some known systems and the opportunities for incorrect setup by an operator are reduced.

Figure 12:
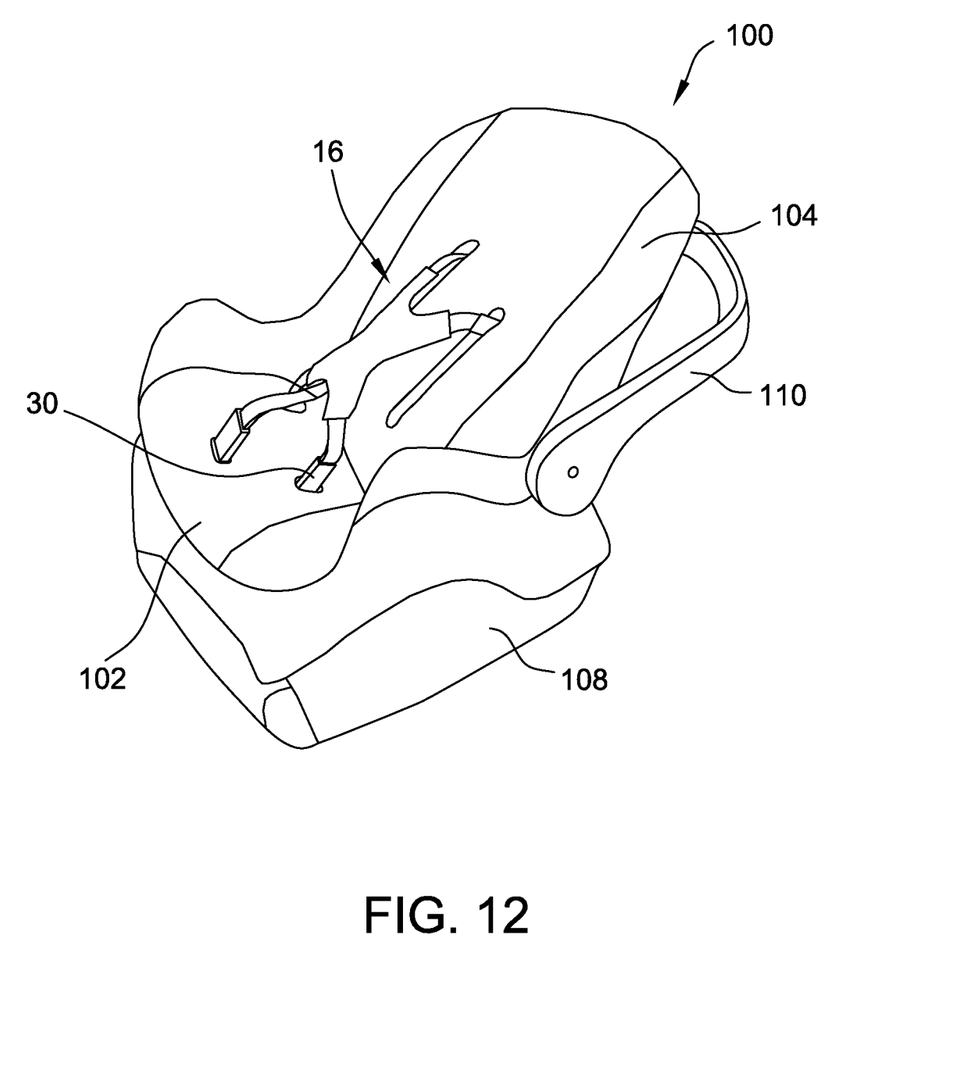
FIG. 12 is a perspective view of another embodiment of a car seat including a child restraint system.

Referring to FIG. 12, a car seat 100 includes a lower support 102, an upper support 104, and the child restraint system 16. The car seat 100 is configured to be secured to a seat of a vehicle and support a child. The child restraint system 16 is configured to retain the child in the car seat 100 and protect the child during movement of the vehicle. In the example embodiment, the car seat 100 may be positioned in a base 108 that is secured to the vehicle. In other embodiments, the car seat 100 may include and/or receive straps, hooks, and/or any other engagement components that facilitate securing the car seat 10 in position.

The lower support 102 is configured to support a lower body of a child. The upper support 104 is connected to the lower support 102 and is configured to support an upper body of the child. In the illustrated embodiment, the car seat 100 is a rear-facing car seat in which the child faces towards the rear end of the vehicle when the child is secured in the car seat 100. The car seat 100 allows the child to be positioned in a recumbent or laid back position. In addition, the car seat 100 is sized and configured to accommodate an infant. The car seat 100 includes a handle 110 and is configured to be released from the base 108 while the base remains secured to the vehicle. Accordingly, the car seat 100 allows for removal of the car seat without disturbing a child in the car seat. In alternative embodiments, the car seat 100 may have any configuration that enables the car seat 100 to operate as described.

As described above, the child restraint system 16 allows a child to be quickly and simply secured in the car seat 100. In addition, the child restraint system 16 allows the child to be removed from the car seat 100 without releasing all the connectors 30. As a result, the risk of disturbing or injuring the child while securing and unsecuring the child using the child restraint system 16 is reduced in comparison to at least some known systems such as systems that include full body straps and a central clip connecting the straps.

Described embodiments provide a child restraint system that is simple to operate and adjust and that properly protects the child. For example, embodiments include a child restraint system that includes 5-points of connection. The connection points may be located along sides, above, and below the child. In addition, the child restraint system includes a harness or safety vest with concealed or integrated straps. Accordingly, the child restraint system does not require full-body straps or a central clip. As a result, a child may be secured and unsecured in the apparatus without repositioning the limbs and body of the child, e.g., without having to pull the child's legs or arms through straps.

In addition, described embodiments allow the child restraint system to be adjusted to accommodate children of different sizes. For example, adjustors allow the connectors of the harness to be the repositioned by pressing an actuator and sliding the adjustor. Accordingly, the harness may be adjusted without removing straps and without positioning straps through openings in the apparatus. As a result, the time required to adjust the child restraint system is reduced and the risk of incorrect adjustment of the child restraint system is decreased.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As various changes could be made in the above constructions without departing from the scope of the invention, it is intended that all matter contained in the above description and shown in the accompanying drawings shall be interpreted as illustrative and not in a limiting sense.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A child restraint system configured to secure a child in a seat, the child restraint system comprising:
    a harness configured to extend across the child, the harness including at least five connectors and straps extending between the connectors, wherein the straps are permanently joined together or integrally formed as a single piece;

anchorages configured to releasably connect to the connectors on a front side of the seat, wherein the anchorages extend through at least one slot in the seat from the front side of the seat to a back side of the seat opposite the harness, wherein the anchorages include at least one shoulder anchorage configured to be positioned adjacent a shoulder of the child; and adjustment mechanisms coupled to the anchorages on the back side of the seat and configured to adjust a position of the anchorages relative to the seat, wherein each adjustment mechanism has a locked configuration in which the adjustment mechanism is prevented from moving along the at least one slot and an unlocked configuration in which the adjustment mechanism is movable along the at least one slot, each adjustment mechanism including a body, a guide coupled to one of the anchorages, and an actuator configured to switch the adjustment mechanism between the locked configuration and the unlocked configuration; and at least one bracket coupled to the seat and extending along the at least one slot, wherein the bracket comprises a plurality of rails, the adjustment mechanisms being movably mounted to at least one of the rails.

2. The child restraint system in accordance with claim 1, wherein the harness includes straps extending between the connectors, and a cover extending over and between the straps.

3. The child restraint system in accordance with claim 2, wherein the cover is pliable and configured to conform to the upper body of the child.

4. The child restraint system in accordance with claim 1, wherein the at least one shoulder anchorage comprises a first shoulder anchorage and a second shoulder anchorage, the anchorages including the first shoulder anchorage, the second shoulder anchorage, a first hip anchorage, a second hip anchorage, and a middle anchorage.

5. A child restraint system configured to secure a child in a seat, the child restraint system comprising:

a harness configured to extend across the child, the harness including connectors and straps extending between the connectors, wherein the straps are permanently joined together or integrally formed as a single piece;

anchorages configured to releasably connect to the connectors on a front side of the seat, wherein the anchorages extend through at least one slot in the seat from the front side of the seat to a back side of the seat opposite the harness, an adjustment mechanism coupled to at least one of the anchorages on the back side of the seat and configured to adjust a position of the at least one anchorage relative to the seat, wherein the adjustment mechanism has a locked configuration in which the adjustment mechanism is prevented from moving along the slot and an unlocked configuration in which the adjustment mechanism is movable along the slot, the adjustment mechanism including a body, a guide, and an actuator, wherein the guide is coupled to the at least one anchorage and the actuator is configured to switch the adjustment mechanism between the locked configuration and the unlocked configuration, wherein the adjustment mechanism includes a spring to bias the adjustment mechanism towards the locked configuration; and at least one bracket configured to extend along the slot, the adjustment mechanism being movably mounted to the at least one bracket, wherein the adjustment mechanism further includes an engagement feature coupled to the actuator and configured to engage the at least one bracket when the adjustment mechanism is in the locked configuration.

6. The child restraint system in accordance with claim 5, wherein the anchorages comprise a first shoulder anchorage configured to extend through a first slot and a second shoulder anchorage configured to extend through a second slot.

7. The child restraint system in accordance with claim 6, wherein the adjustment mechanism is a first adjustment mechanism and is coupled to the first shoulder anchorage and is configured to adjust the position of the first shoulder anchorage relative to the seat, the child restraint system further comprising a second adjustment mechanism coupled to the second shoulder anchorage and configured to adjust a position of the second shoulder anchorage relative to the seat.

8. A car seat comprising:

a lower support configured to support a lower body of a child;

an upper support connected to the lower support and configured to support an upper body of the child, wherein the upper support extends from the lower support at an angle relative to the lower support, wherein at least one of the lower support and the upper support defines at least one slot extending along a longitudinal axis of the at least one of the lower support and the upper support; and a child restraint system configured to secure the child in the car seat, the child restraint system comprising:

a harness configured to extend across the child, the harness including connectors and straps extending between the connectors, wherein the straps are permanently joined together or integrally formed as a single piece;

at least one anchorage configured to releasably connect to at least one of the connectors on a front side of the upper support, wherein the at least one anchorage extends through the at least one slot from the front side of the upper support to a back side of the upper support opposite the harness;

an adjustment mechanism coupled to the at least one anchorage on the back side of the upper support and configured to adjust a position of the at least one anchorage relative to the at least one of the upper support and the lower support, wherein the adjustment mechanism has a locked configuration in which the adjustment mechanism is prevented from moving along the at least one slot and an unlocked configuration in which the adjustment mechanism is movable along the at least one slot, the adjustment mechanism including a body, a guide, and an actuator, wherein the guide is coupled to the at least one anchorage and the actuator is configured to switch the adjustment mechanism between the locked configuration and the unlocked configuration and at least one bracket coupled to the upper support and extending along the at least one slot, wherein the bracket comprises a plurality of rails, the adjustment mechanism being movably mounted to at least one of the rails.

9. The car seat in accordance with claim 8, wherein the adjustment mechanism further includes an engagement feature coupled to the actuator and configured to engage the at least one bracket when the adjustment mechanism is in the locked configuration, wherein the engagement feature is coupled to the body by a hinge and is configured to pivot about the hinge.

10. The car seat in accordance with claim 9, wherein the adjustment mechanism includes a spring to bias the adjustment mechanism towards the locked configuration.

11. The car seat in accordance with claim 8, wherein the at least one slot comprises a first slot and a second slot defined by the upper support, and wherein the at least one anchorage comprises a first shoulder anchorage configured to extend through the first slot and a second shoulder anchorage configured to extend through the second slot.

12. The car seat in accordance with claim 11, wherein the adjustment mechanism is a first adjustment mechanism and is coupled to the first shoulder anchorage and is configured to adjust the position of the first shoulder anchorage relative to the upper support, the child restraint system further comprising a second adjustment mechanism coupled to the second shoulder anchorage and configured to adjust a position of the second shoulder anchorage relative to the upper support.

13. The car seat in accordance with claim 11, wherein the child restraint system further comprises a middle anchorage and hip anchorages, the middle anchorage and the hip anchorages extending through openings defined in the lower support.

14. The car seat in accordance with claim 13, wherein the middle anchorage and the hip anchorages are configured to releasably connect to the connectors of the harness adjacent the lower support.

* * * * *